(12) United States Patent
Chou

(10) Patent No.: US 9,533,423 B2
(45) Date of Patent: Jan. 3, 2017

(54) VIBRATING RAZOR

(71) Applicant: I-CHIUN PRECISION INDUSTRY CO., LTD., New Taipei (TW)

(72) Inventor: Wan-Shun Chou, New Taipei (TW)

(73) Assignee: I-CHIUN PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/716,928

(22) Filed: May 20, 2015

(65) Prior Publication Data
US 2015/0251327 A1  Sep. 10, 2015

Related U.S. Application Data

(63) Continuation-in-part of application No. 13/804,648, filed on Mar. 14, 2013, now abandoned.

(51) Int. Cl.
*B26B 21/38* (2006.01)
*H02K 33/00* (2006.01)

(52) U.S. Cl.
CPC ............... *B26B 21/38* (2013.01); *H02K 33/00* (2013.01)

(58) Field of Classification Search
CPC .............. H02K 5/00; H02K 5/04; H02K 5/26; H02K 33/00; B26B 21/38
USPC ... 30/44, 45, 526; 310/81, 36; 15/22.2, 22.4, 15/93.1
See application file for complete search history.

(56) References Cited

U.S. PATENT DOCUMENTS

| | | | | |
|---|---|---|---|---|
| 5,046,249 A * | 9/1991 | Kawara | ................. | B26B 21/38 30/44 |
| 6,105,252 A * | 8/2000 | Andis | ................. | B26B 21/38 30/210 |
| 6,481,104 B1 * | 11/2002 | Parker | ................. | B26B 21/38 30/45 |
| 6,984,903 B2 * | 1/2006 | Chang | ................. | H02K 7/063 310/36 |
| 7,800,274 B2 * | 9/2010 | Yamaguchi | ............ | H02K 1/182 310/254.1 |
| 2006/0218794 A1 * | 10/2006 | Bunnell | ................. | B26B 21/225 30/44 |
| 2008/0098603 A1 * | 5/2008 | Noble | ................. | B26B 21/526 30/44 |
| 2008/0148574 A1 * | 6/2008 | Chou | ................. | B26B 21/38 30/45 |
| 2009/0000125 A1 * | 1/2009 | Peyser | ................. | B26B 19/06 30/34.1 |
| 2010/0313425 A1 * | 12/2010 | Hawes | ................. | A45D 26/00 30/44 |

* cited by examiner

*Primary Examiner* — Stephen Choi
*Assistant Examiner* — Evan MacFarlane
(74) *Attorney, Agent, or Firm* — Bruce Stone LLP; Joseph A. Bruce

(57) ABSTRACT

A vibrating razor includes a handle, a razor blade and a flat-type vibration motor. The handle includes a front end having a receiving slot provided thereon; wherein the receiving slot includes a bottom wall. The razor blade is arranged at the front end of the handle. The flat-type vibration motor is arranged within the receiving slot and includes an outer shell with a cover; wherein the cover includes an external protruding dot on one side of an outer surface thereof. The flat-type vibration motor contacts the bottom wall of the receiving slot via the external protruding dot. Therefore, the external protruding dot can be utilized to increase the vibration strength of the razor blade as the flat-type vibration motor rotates to impact the bottom wall of the receiving slot.

6 Claims, 5 Drawing Sheets

VIBRATING RAZOR

BACKGROUND OF THE INVENTION

Field of the Invention

The present invention relates to a razor, in particular, to a vibrating razor and more particularly, to a horizontal vibration-type razor.

Description of Related Art

During shaving along the surface of the skin with a conventional razor equipped with razor blades, the movement of the razor blades tends to exert a force of pulling on the beard that is not being completely trimmed off, and it is necessary to completely trim off the beard in order to allow the beard to return to its original position. Therefore, it is common to find that users may feel a sense of pain during shaving as the beard is being pulled by the razor blades. To overcome such problem, electric razors and vibrating razors are developed and introduced to the market.

Although electric razors mostly use rotational razor blades such that the level of user manipulation by hand can be effectively reduced, they tend to leave behind incompletely shaved spots and are not designed to work with the application of liquid or gel type of shaving lotions, which are of less shaving comforts to users. Furthermore, electric razors are of much higher costs and are of heavier weights, making them less popular or common to users.

Vibrating razors are able to generate vibrations on the razor blades such that the razor blades are able to move quickly back and forth on the skin with a short distance in order to gradually shave the beard with a fast speed and to generate a smaller force of pulling on the beard; therefore, users may have a greater comfort during shaving. In other words, users using vibrating razors may feel much less pain and discomfort caused by pulling of the skin during shaving in comparison to the use of traditional razors. In addition, vibrating razors can work with liquid or gel type of shaving lotions such that the comfort during shaving can be greatly increased.

Nevertheless, as conventional vibrating razors mostly include a vibration motor that is of a relatively large size and tends to be arranged at a position far from the razor blades, the vibration force cannot be effectively transmitted to the razor blades, which in turn, unfavorably decreases the effect of shaving with such vibrating razors.

SUMMARY OF THE INVENTION

An objective of the present invention is to provide a vibrating razor capable of effectively transmitting vibration force to the razor blade thereof.

To achieve the aforementioned objective, the present invention provides a vibrating razor, comprising a handle, a razor blade and a flat-type vibration motor. The handle comprises a front end having a receiving slot provided thereon; wherein the receiving slot comprises a bottom wall. The razor blade is arranged at the front end of the handle. The flat-type vibration motor is received within the receiving slot and comprises an outer shell with a cover; wherein the cover comprises an external protruding dot protruded on one side of an outer surface thereof; and wherein the flat-type vibration motor contacts the bottom wall via the protruding dot.

Preferably, according to the aforementioned vibrating razor, the flat-type vibration motor and the razor blade are arranged to be on a vibration co-plane.

Preferably, according to the aforementioned vibrating razor, the external protruding dot comprises a plurality of external protruding dots, and the plurality of external protruding dots are aligned to circumference an edge of the cover.

Preferably, according to the aforementioned vibrating razor, the outer shell of the flat-type vibration motor comprises an eccentric rotor, a rotating axle and a ring magnet therein; the eccentric rotor is rotatably connected to the cover via the rotating axle; the ring magnet is mounted onto the rotating axle and between the eccentric rotor and the cover.

Preferably, according to the aforementioned vibrating razor, the flat-type vibration motor comprises a shield covering the eccentric rotor externally.

Preferably, according to the aforementioned vibrating razor, the cover comprises an internal protruding dot.

Preferably, according to the aforementioned vibrating razor, the external protruding dot comprises a plurality of external protruding dots, and the plurality of external protruding dots are aligned to circumference an edge of the cover.

Preferably, according to the aforementioned vibrating razor, the internal protruding dot comprises a plurality of internal protruding dots, and the plurality of internal protruding dots are aligned to circumference an edge of the cover.

Preferably, according to the aforementioned vibrating razor, the plurality of external protruding dots and the plurality internal protruding dot are arranged to be offset from each other.

Preferably, according to the aforementioned vibrating razor, the internal protruding dot abuts one side of the ring magnet such that the ring magnet and the cover are arranged to be titled from each other and such that the eccentric rotor rotates to impact the ring magnet intermittently.

The vibrating razor of the present invention utilizes the external protruding dots provided on the outer surface of the cover of the outer shell such that the flat-type vibration motor is able to vibrate and to impact the bottom wall of the slot during the rotation thereof in order to increase the vibration strength of the razor blade and to generate vibrations at different directions. Furthermore, as the eccentric rotor rotates to impact the ring magnet, the vibration strength of the razor blade is advantageously increased.

DETAILED DESCRIPTION OF THE INVENTION

Figure 1:
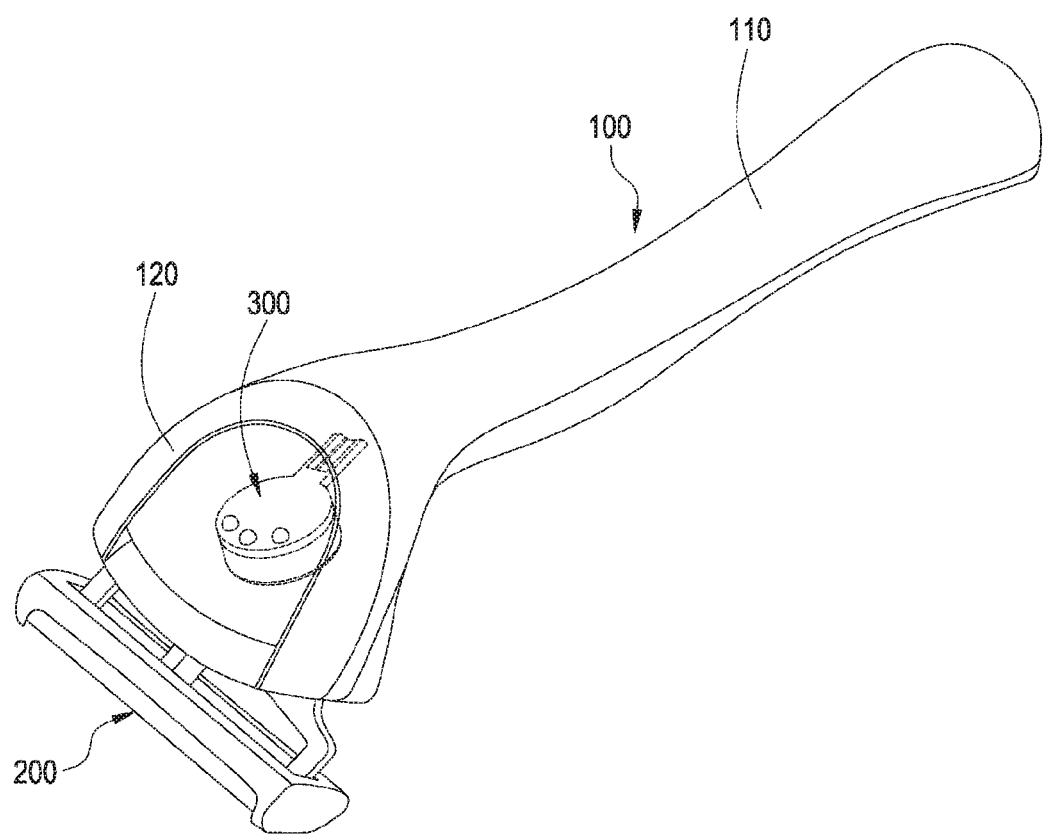
FIG. 1 is a perspective view of a preferred embodiment of a vibrating razor of the present invention.

Please refer to FIG. 1. As shown in the figure, a preferred embodiment of the present invention provides a vibrating razor comprising a handle 100, a razor blade 200 and a flat-type vibration motor 300.

Figure 2:
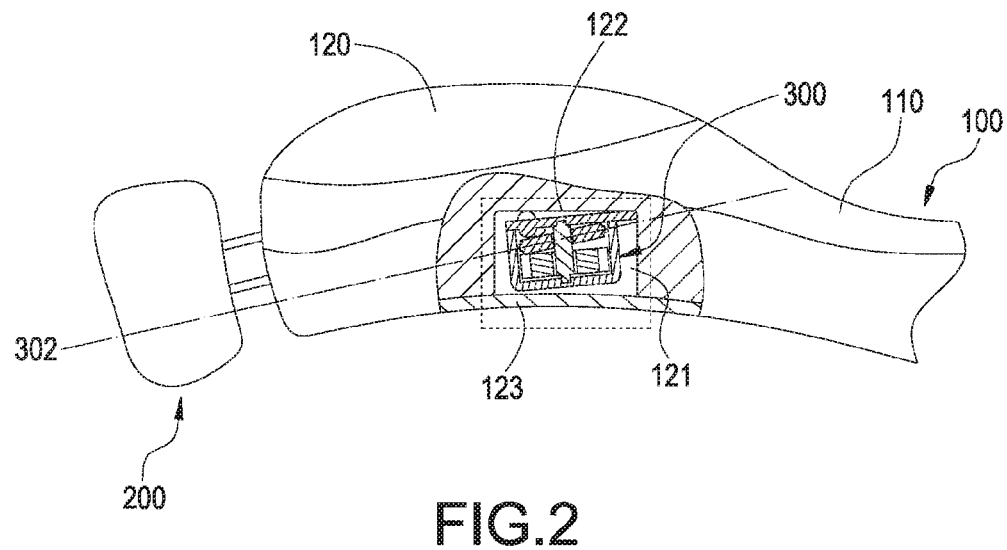
FIG. 2 is a partial cross-sectional view of the preferred embodiment of the vibrating razor of the present invention.

As shown in FIG. 1 and FIG. 2, the handle 100 is of a shape of an arched shaft. The handle 100 comprises a gripping portion 110 for an user to grip thereon and a front end 120 extended from the gripping portion 110. The gripping portion 110 and the front end 120 are arranged to be at an angle with each other. The front end 120 comprises a receiving slot 121 provided thereon, and the receiving slot 121 comprises a bottom wall 122 in an internal thereof. In addition, the receiving slot 121 is closed by a waterproof cover 123. The razor blade 200 is arranged to be at the front end 120 of the handle 100.

Figure 3:
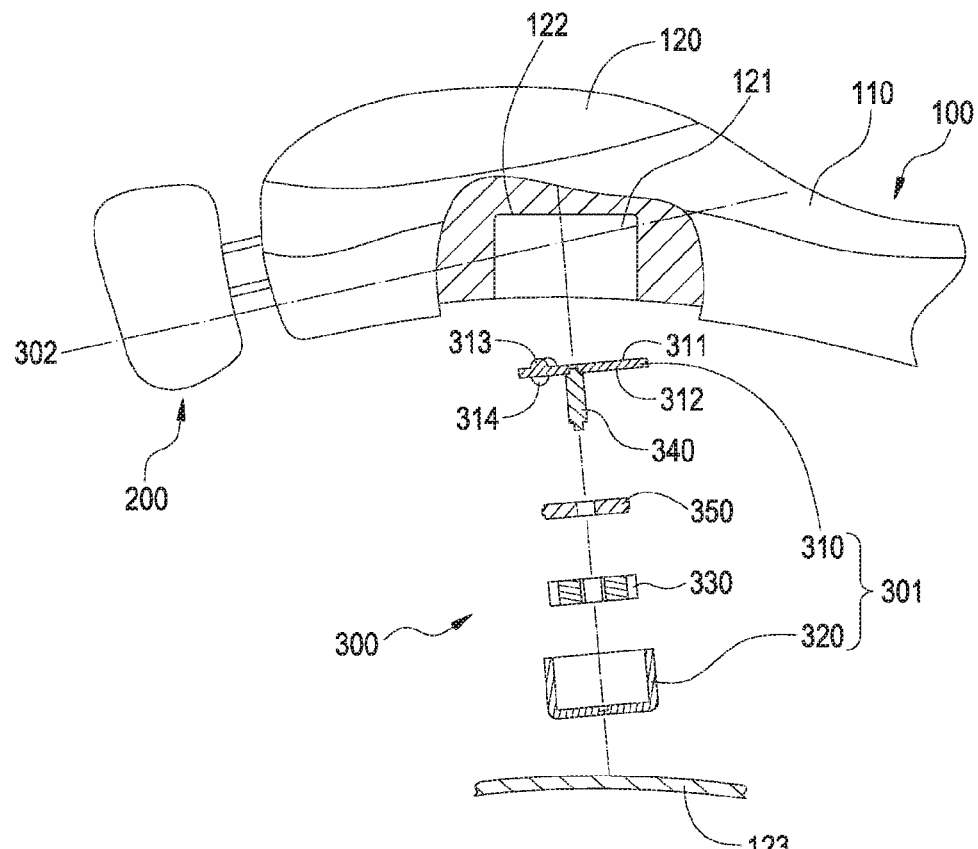
FIG. 3 is an illustration showing the arrangement of the flat-type vibration motor of the preferred embodiment of the vibrating razor of the present invention.

As shown in FIG. 2 and FIG. 3, in this embodiment, the flat-type vibration motor 300 is preferably to be of a flat round column shape that coincides with the shape of the receiving slot 121 of the handle 100. The flat-type vibration motor 300 is received within the receiving slot 121 and is separated from the outside of the receiving slot 121 with the waterproof cover 123. The flat-type vibration motor 300 comprises an outer shell 301, an eccentric rotor 330, a rotating axle 340 and a ring magnet 350; wherein the eccentric rotor 330, rotating axle 340 and the ring magnet 350 are all received within the outer shell 301.

Figure 4:
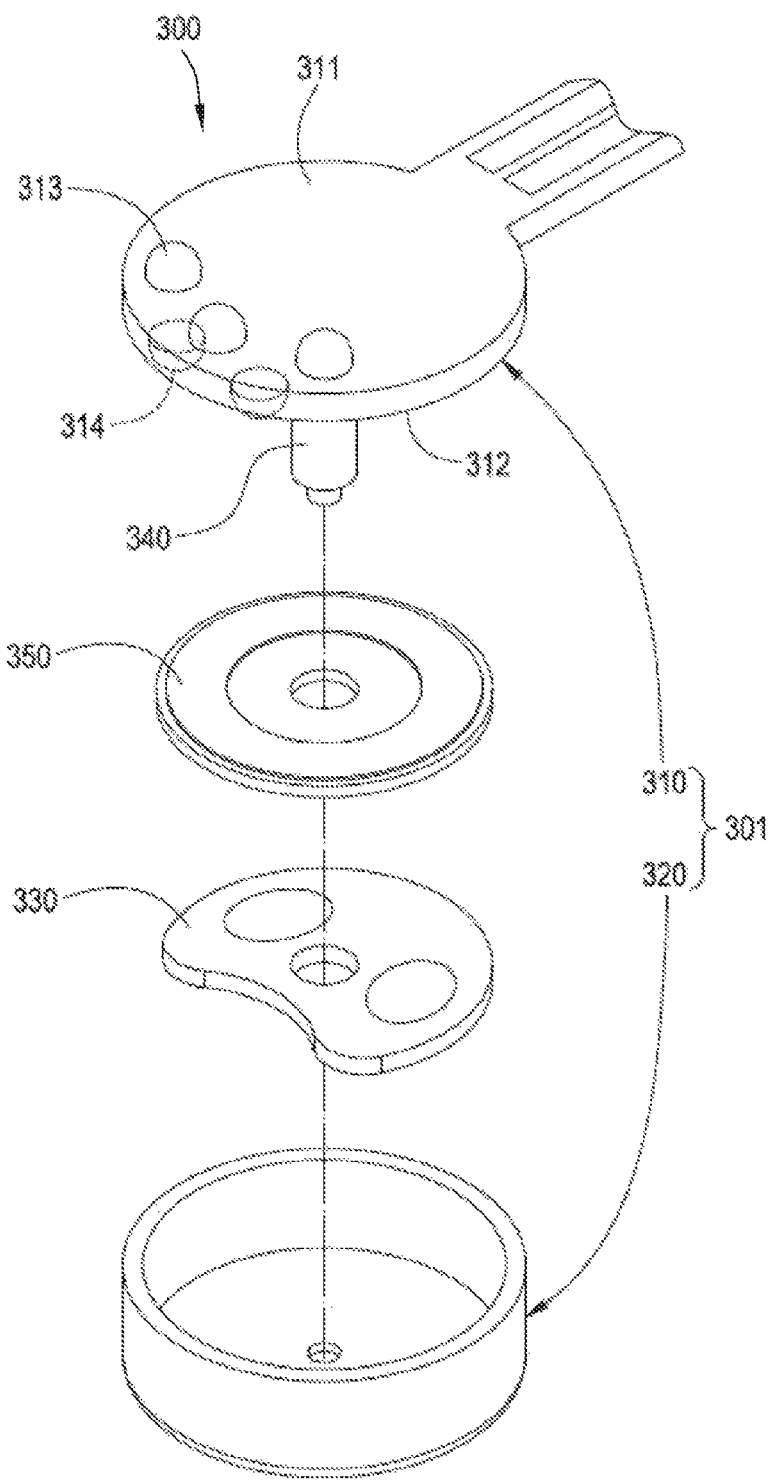
FIG. 4 is an exploded view of the flat-type vibration motor of the preferred embodiment of the vibrating razor of the present invention.

As shown in FIG. 3 and FIG. 4, the outer shell 301 comprises a cover 310 and a shield 320. In this embodiment, the cover 310 is of a round plate shape while the shield 320 is of a round column shape corresponding to the shape of the cover 310; and wherein the shield 320 is preferably to be of a round column shape with one opening end. The eccentric rotor 330 is rotatably connected to the cover 310 via the rotating axle 340, and the ring magnet 350 is mounted onto the rotating axle 340 and between the eccentric rotor 330 and the cover 310. Preferably, the eccentric rotor 330 is able to rotate along a circumferential path on a vibration plane 302 with the rotating axle 340. The cover 310 covers the eccentric rotor 330 and the ring magnet 350 externally, and the cover 310 and the shield 320 are attached and sealed onto each other.

Figure 5:
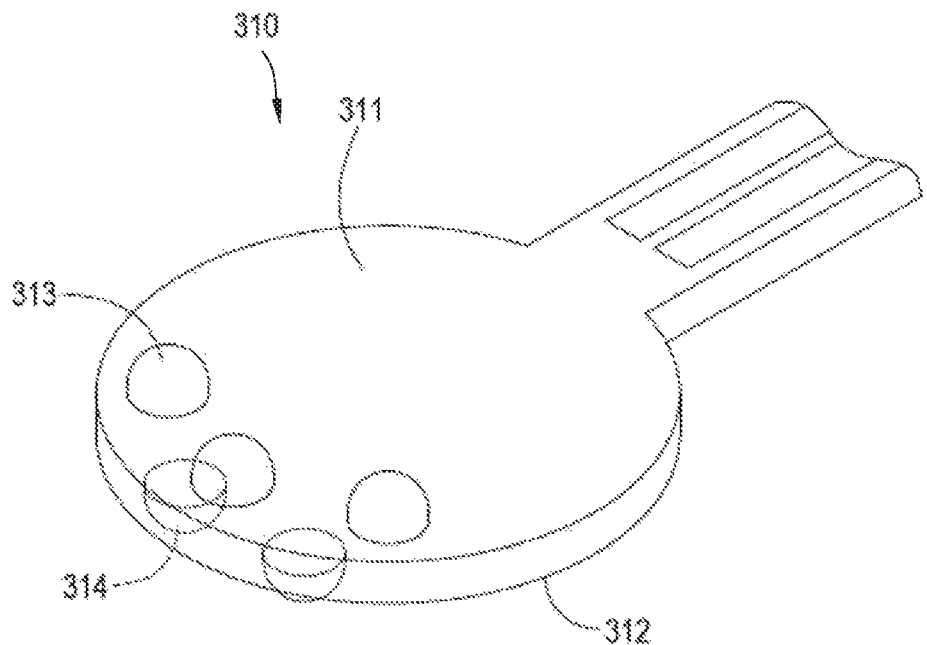
FIG. 5 is a perspective view of the cover of the flat-type vibration motor of the preferred embodiment of the vibrating razor of the present invention.
Figure 6:
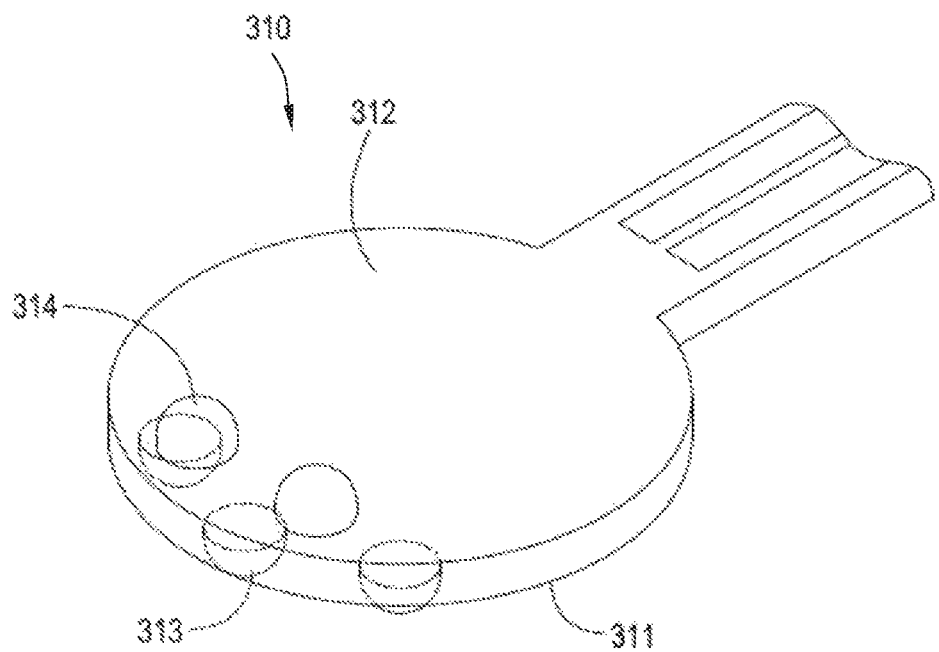
FIG. 6 is another perspective view of the cover of the flat-type vibration motor of the preferred embodiment of the vibrating razor of the present invention.

As shown in FIG. 4 to FIG. 6, in this embodiment, the external bottom surface 311 of the cover 310 comprises three external protruding dots 313 protruded thereon. The inner bottom surface 312 of the cover 310 comprises two internal protruding dots 314 protruded thereon. Each one of the external protruding dots 313 is of a semi-dome shape, and the plurality of external protruding dots 313 are aligned to circumference an edge of the cover 310 and are unsymmetrically arranged to be on one side of the external bottom surface 311 of the cover 310. Each one of the internal protruding dots 314 is of a semi-dome shape, and the plurality of internal protruding dots 314 are aligned to circumference an edge of the cover 310 and are unsymmetrically arranged to be on one side of the internal bottom surface 312 of the cover 310. The external protruding dots and the internal protruding dots are arranged to correspond with each other and, preferably, are arranged to be offset from each other. In this embodiment, each one of the internal protruding dots 314 is arranged to be at a corresponding position between two external protruding dots 313 on the external bottom surface 311 of the cover 310.

Figure 2A:
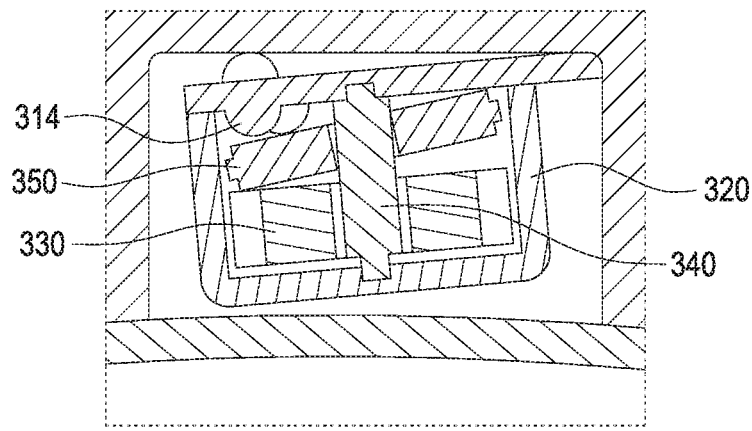
FIGS. 2(A) and 2(B) are enlarged views showing an eccentric rotor of the vibrating razor that impacts a ring magnet of the vibrating razor intermittently during the operation.
Figure 2B:
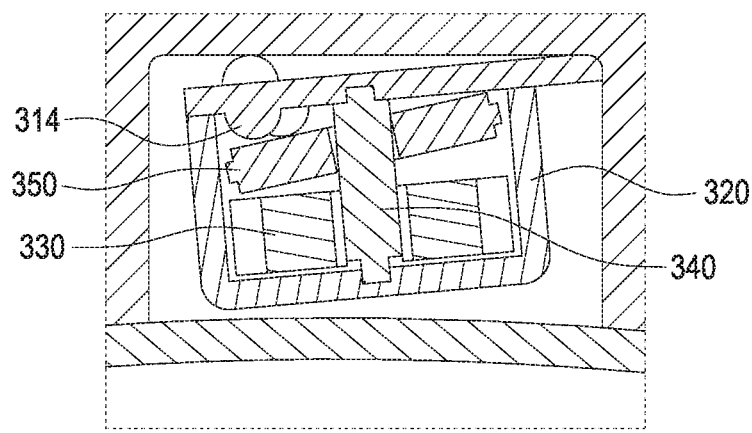

As shown in FIG. 3 and FIG. 4, the external protruding dots 313 contact the bottom wall 122 of the receiving slot 121 such that the flat-type vibration motor 300 and the bottom wall 122 are arranged to be tilted from each other within the receiving slot 121. The internal protruding dots 314 abut one side of the ring magnet 350 such that the ring magnet 350 and the cover 310 are arranged to be tilted from each other and such that the eccentric rotor 330 impacts the ring magnet 350 intermittently during the rotation thereof as shown in FIG. 2(A) and FIG. 2(B). FIG. 2(A) shows the eccentric rotor 330 having impact with the ring magnet 350 at one moment while FIG. 2(B) shows no impact at the next moment then, and these situations are repeating again and again during the operation of the vibrating razor.

Preferably, the flat-type vibration motor 300 and the razor blade 200 are arranged to be on a vibration co-plane 302 such that the razor blade 200 is driven by the eccentric rotor 330 on the vibration co-plane 302 to generate a shaving force along the direction of the vibration co-plane 302. However, the razor blade 200 can be also arranged at an angle with the vibration co-plane 302 in order to generate shaving forces in other directions (said angle can be varied depending upon the needs). The handle 110 of the vibrating razor of the present invention are arranged at an angle with the front end 120 thereof such that when the user grips onto the gripping portion 110, the vibration co-plane 302 is generally in a horizontal direction. When the eccentric rotor 330 rotates, the inertia force generated by the rotation causes the front end 120 of the handle 100 to vibrate along the vibration co-plane 302 such that the vibration force in the horizontal direction is generated. As the razor blade 200 is arranged to be on the vibration co-plane 302, the inertia force generated by the rotation of the eccentric rotor 330 can be ensured to be transmitted to the razor blade 200 via the front end 120 of the handle 100 in order to cause the razor blade 200 to vibrate on the vibration co-plane 302, which in turn allows the razor blade 200 to vibrate in the directions that are both horizontal and vertical to the skin surface at the same time. The vibration of the razor blade 200 horizontal to the skin surface is able to trim off beard effectively while the vibration vertical to the skin surface can be used for massaging the skin. When the razor blade 200 and the vibration co-plane 302 are arranged at an angle with each other, vibration forces can still be generated along the direction of the angle on the skin surface.

The vibrating razor of the present invention utilizes the external protruding dots 313 provided on the outer surface of the cover 310 of the outer shell 301 to allow the flat-type vibration motor 300 to be at a tilted arrangement with the bottom wall 122 of the receiving slot 121. As a result, a gap is formed between the cover 310 of the flat-type vibration motor 300 and the bottom wall 122 of the receiving slot 121 such that the eccentric rotor 330 rotates to cause the flat-type vibration motor 300 to impact the bottom wall 122 of the receiving slot 121 in order to increase the vibration strength of the razor blade 200 and to generate vibrations in different directions at the same time. Furthermore, the vibrating razor of the present invention is able to increase the vibration strength of the razor blade 200 as the eccentric rotor 330 impacts the ring magnet 350 intermittently during the rotation thereof.

It can be understood that the preferred embodiments of the present invention are provided for illustrative purposes only, which shall not be used to limit the scope of the present invention. Any other modifications and variations in relation to the spirit of the present invention and capable of generating substantially equivalent outcomes shall all be considered to be within the scope of the present invention.

What is claimed is:

1. A vibrating razor, comprising:
   a handle comprising a front end having a receiving slot provided on the front end, wherein said receiving slot comprises a bottom wall;
   a razor blade arranged at said front end of said handle; and
   a flat-type vibration motor received within said receiving slot and comprising an outer shell with a cover, wherein said cover comprises an external protruding dot protruded on one side of an outer surface of the cover, and wherein said flat-type vibration motor contacts said bottom wall via said external protruding dot;
   wherein said outer shell of said flat-type vibration motor comprises an eccentric rotor, a rotating axle and a ring magnet in the outer shell, said eccentric rotor is rotatably connected to said cover via said rotating axle, and said ring magnet is mounted onto said rotating axle and between said eccentric rotor and said cover;
   wherein said cover comprises an internal protruding dot; and
   wherein said internal protruding dot abuts one side of said ring magnet such that said ring magnet and said cover are arranged to be titled from each other and such that said eccentric rotor rotates to impact said ring magnet intermittently.

2. The vibrating razor according to claim 1, wherein said flat-type vibration motor and said razor blade are arranged to be on a vibration co-plane.

3. The vibrating razor according to claim 1, wherein said external protruding dot comprises a plurality of external protruding dots, and said plurality of external protruding dots are aligned to a circumference of an edge of said cover.

4. The vibrating razor according to claim 1, wherein said flat-type vibration motor comprises a shield covering said eccentric rotor externally.

5. The vibrating razor according to claim 1, wherein said internal protruding dot comprises a plurality of internal protruding dots, and said plurality of internal protruding dots are aligned to a circumference of an edge of said cover.

6. The vibrating razor according to claim 5, wherein said external protruding dot comprises a plurality of external protruding dots, and wherein said plurality of external protruding dots and said plurality of internal protruding dots are arranged to be offset from each other.

* * * * *